US012621693B2

(12) United States Patent
Farhadi et al.

(10) Patent No.: US 12,621,693 B2
(45) Date of Patent: May 5, 2026

(54) EVENT-BASED TRIGGERING OF CHANNEL QUALITY MEASURES

(71) Applicant: Telefonaktiebolaget LM Ericsson (publ), Stockholm (SE)

(72) Inventors: Hamed Farhadi, Stockholm (SE); Niklas Wernersson, Kungsängen (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 320 days.

(21) Appl. No.: 18/279,813

(22) PCT Filed: Mar. 5, 2021

(86) PCT No.: PCT/SE2021/050198
§ 371 (c)(1),
(2) Date: Aug. 31, 2023

(87) PCT Pub. No.: WO2022/186743
PCT Pub. Date: Sep. 9, 2022

(65) Prior Publication Data
US 2024/0154717 A1     May 9, 2024

(51) Int. Cl.
*H04B 7/0408*     (2017.01)
*H04B 7/06*     (2006.01)
(Continued)

(52) U.S. Cl.
CPC .......... *H04W 24/08* (2013.01); *H04B 7/0408* (2013.01); *H04B 7/0626* (2013.01);
(Continued)

(58) Field of Classification Search
CPC .. H04B 7/02–12; H04B 17/0082–3913; H04L 1/0001–248; H04L 5/0001–26;
(Continued)

(56) References Cited

U.S. PATENT DOCUMENTS

2014/0146777 A1     5/2014   Shin et al.
2017/0141823 A1*    5/2017   Fodor ................... H04W 24/08
(Continued)

FOREIGN PATENT DOCUMENTS

CN     111600757 A     8/2020
EP       1635592 A1    3/2006
(Continued)

OTHER PUBLICATIONS

International Search Report and Written Opinion in PCT/SE2021/050198 dated Nov. 29, 2021, 11 pages.
(Continued)

*Primary Examiner* — Timothy J Weidner
(74) *Attorney, Agent, or Firm* — Rothwell, Figg, Emst & Manbeck, P.C.

(57)     ABSTRACT

There is provided mechanisms for event-based triggering of second channel quality measures. A method is performed by a network node. The method comprises obtaining a first measure of channel quality of a radio propagation channel extending between the network node and a user equipment from measurements on an uplink signal received from the user equipment. The method comprises triggering, when determining that the first measure of channel quality causes an event-based triggering condition to be fulfilled, transmission of a further uplink signal from the user equipment for the network node to obtain a second measure of the quality of the radio propagation channel. Determining that the first measure of channel quality causes the event-based triggering condition to be fulfilled involves making a comparison between the first measure of channel quality and a reference channel quality.

19 Claims, 4 Drawing Sheets

(51) Int. Cl.

| | |
|---|---|
| *H04B 17/309* | (2015.01) |
| *H04B 17/382* | (2015.01) |
| *H04W 24/08* | (2009.01) |
| *H04W 24/10* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.

CPC ......... *H04B 17/309* (2015.01); *H04B 17/382* (2015.01); *H04W 24/10* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search

CPC ........... H04W 24/02–10; H04W 36/0005–385; H04W 84/02–16; H04W 88/02–12; H04W 92/02–04; H04W 92/10; Y02D 30/70

See application file for complete search history.

(56) References Cited

U.S. PATENT DOCUMENTS

| | | | |
|---|---|---|---|
| 2017/0230849 A1* | 8/2017 | Wei | ........................ H04W 24/08 |
| 2019/0349121 A1 | 11/2019 | Tian et al. | |
| 2021/0044390 A1 | 2/2021 | Pezeshki et al. | |
| 2023/0275719 A1* | 8/2023 | Ma | ........................ H04W 24/08 |

FOREIGN PATENT DOCUMENTS

| | | |
|---|---|---|
| EP | 3317976 B1 | 5/2018 |
| WO | 2017007377 A1 | 1/2017 |
| WO | 2017/054457 A1 | 4/2017 |

OTHER PUBLICATIONS

Moderator (InterDigital, Inc.), Feature lead summary #2 on CSI feedback enhancements for enhanced URLLC/IIoT, 3GPP TSG RAN WG1 #103-e, R1-2009558, e-Meeting, Oct. 26-Nov. 13, 2020, 38 pages.

Qualcomm Incorporated, CSI enhancement for IOT and URLLC, 3GPP TSG RAN WG1 #103-e, R1-2009258, e-Meeting, Oct. 26-Nov. 13, 2020, 17 pages.

* cited by examiner

EVENT-BASED TRIGGERING OF CHANNEL QUALITY MEASURES

CROSS REFERENCE TO RELATED APPLICATION(S)

This application is a 35 U.S.C. § 371 National Stage of International Patent Application No. PCT/SE2021/050198, filed Mar. 5, 2021.

TECHNICAL FIELD

Embodiments presented herein relate to a method, a network node, a computer program, and a computer program product for event-based triggering of channel quality measures.

BACKGROUND

In communications networks, there may be a challenge to obtain good performance and capacity for a given communications protocol, its parameters and the physical environment in which the communications network is deployed.

For example, for millimeter wave (mmWave) beamforming, hybrid multiple-antenna beamforming combining large-dimensional pre/postprocessing (in time domain) with lower dimensional digital processing (in frequency domain) can be used for reducing hardware costs and training overhead in multi-antenna systems operating at the mmWave frequency band. This leads to a need for lower number of radio frequency chains (and hence lower hardware cost) for processing of signals received over large antenna arrays.

The accuracy of the beamforming at high frequency band relies on the quality of acquired channel state information (CSI). CSI comprises information regarding the propagation of the signal from transmitter to receiver and includes the combined effect of, for example, scattering, fading, and the decaying power with distance. In a communication system with possible one/multiple antenna(s) at transmitter and receiver, the CSI can represent the effective signal attenuation between each transmit and receive antenna pair, or a function of this. For example, in a system with M transmit antenna and N receive antennas, the received signal can be represented as follows:

$$y(t) = H(t)x(t) + n(t),$$

where x(t) is an M×1 transmit vector, y(t) is an N×1 receive vector, n(t) is an N×1 received noise vector, and H(t) is an N×M matrix of channel gains at time instance t. The element in the i:th row and the j:th column of the matrix H(t) is denoted as $h_{ij}$ and represents the signal attenuation from the j:th antenna of the transmitter to the i:th antenna of the receiver. The CSI can be represented as an estimation of H(t) or a function of it, e.g. the covariance of H (t), denoted as Q (t), or the quantized version of H(t) denoted as $\hat{H}(t)$.

CSI can be acquired by either of codebook-based or reciprocity-based approaches as follows.

Codebook-based CSI acquisition relies on Channel State Information Reference Signal (CSI-RS) sent in the downlink (i.e., from access network node towards user equipment). The user equipment receives the CSI-RS and use it to estimate the channel and report channel quality information back to the access network node. Certain information is extracted based on the estimated CSI at the user equipment (such as RI (rank indicator) to be used for selecting the number of layers for MIMO transmission, PMI (precoding matrix indicator) to be used for selecting the precoding matrix to be used at the transmitter to conduct beamforming, and CQI (channel quality feedback) that indicate the quality of the channel and can be used for link adaptation at the transmitter side. RI, PMI, and CQI are computed as functions of estimated CSI and are mapped to codewords in pre-designed codebooks for each of these quantities, and the indices of the appropriate codewords will be sent to the access network node. The CSI-RS might be configured specific to each user equipment, but multiple user equipment can also share the same CSI-RS.

Reciprocity-based CSI acquisition relies on Sounding Reference Signals (SRSs) sent in the uplink i.e., from user equipment towards access network node). The SRS is transmitted by the user equipment to help the access network node obtain the CSI for each user equipment. The access network node exploits the underlying reciprocity of the radio propagation channel between the downlink and the uplink and extrapolates the CSI for the downlink from the received SRSs. The SRS is configured specific to each user equipment.

Allocating more radio resources for CSI acquisition enables more accurate CSI to be obtained, but results in less radio resources being available for payload data to be communicated. Triggering CSI acquisition causes power consumption of the user equipment to increase. Further, using a fixed amount of radio resources allocated for CSI acquisition does not allow the CSI acquisition to adapt to changing radio propagation channel conditions and may lead to a level of CSI quality that is inefficient for the data communication. As a first example, for a stationary receiver (like for example in a fixed wireless access (FWA) network) the radio propagation channel conditions may be very stable channel, and triggering CSI acquisition too often may incur a high cost in radio resources, without improving the accuracy of the CSI. As a second example, for a fast-moving receiver the radio propagation channel conditions may change very rapidly, and triggering CSI acquisition too seldom may result in CSI being outdated, possibly resulting in the beamforming becoming inaccurate.

Hence, there is still a need for an improved acquisition of CSI.

SUMMARY

An object of embodiments herein is to address the above issues by providing techniques for efficient acquisition of accurate CSI.

According to a first aspect there is presented a method for event-based triggering of second channel quality measures. The method is performed by a network node. The method comprises obtaining a first measure of channel quality of a radio propagation channel extending between the network node and a user equipment from measurements on an uplink signal received from the user equipment. The method comprises triggering, when determining that the first measure of channel quality causes an event-based triggering condition to be fulfilled, transmission of a further uplink signal from the user equipment for the network node to obtain a second measure of the channel quality of the radio propagation channel. Determining that the first measure of channel quality causes the event-based triggering condition to be fulfilled involves making a comparison between the first measure of channel quality and a reference channel quality.

According to a second aspect there is presented a network node for event-based triggering of second channel quality measures. The network node comprises processing circuitry. The processing circuitry is configured to cause the network node to obtain a first measure of channel quality of a radio propagation channel extending between the network node and a user equipment from measurements on an uplink signal received from the user equipment. The processing circuitry is configured to cause the network node to trigger, when determining that the first measure of channel quality causes an event-based triggering condition to be fulfilled, transmission of a further uplink signal from the user equipment for the network node to obtain a second measure of the channel quality of the radio propagation channel. Determining that the first measure of channel quality causes the event-based triggering condition to be fulfilled involves making a comparison between the first measure of channel quality and a reference channel quality.

According to a third aspect there is presented a network node for event-based triggering of second channel quality measures. The network node comprises an obtain module configured to obtain a first measure of channel quality of a radio propagation channel extending between the network node and a user equipment from measurements on an uplink signal received from the user equipment. The network node comprises a trigger module configured to trigger, when determining that the first measure of channel quality causes an event-based triggering condition to be fulfilled, transmission of a further uplink signal from the user equipment for the network node to obtain a second measure of the channel quality of the radio propagation channel. Determining that the first measure of channel quality causes the event-based triggering condition to be fulfilled involves making a comparison between the first measure of channel quality and a reference channel quality.

According to a fourth aspect there is presented a computer program for event-based triggering of second channel quality measures, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable efficient acquisition of accurate CSI.

Advantageously, the first measure of channel quality can be obtained without actually triggering CSI, i.e., without incurring any costs in terms of radio resources.

Advantageously, according to these aspects, CSI acquisition can be triggered less often when the radio propagation channel is stationary and more often when the radio propagation channel is non-stationary.

Advantageously, these aspects enable precise beamforming to be performed in highly time variant propagation environments (e.g. fast moving user equipment) by increasing how often the CSI acquisition is triggered.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein;

rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
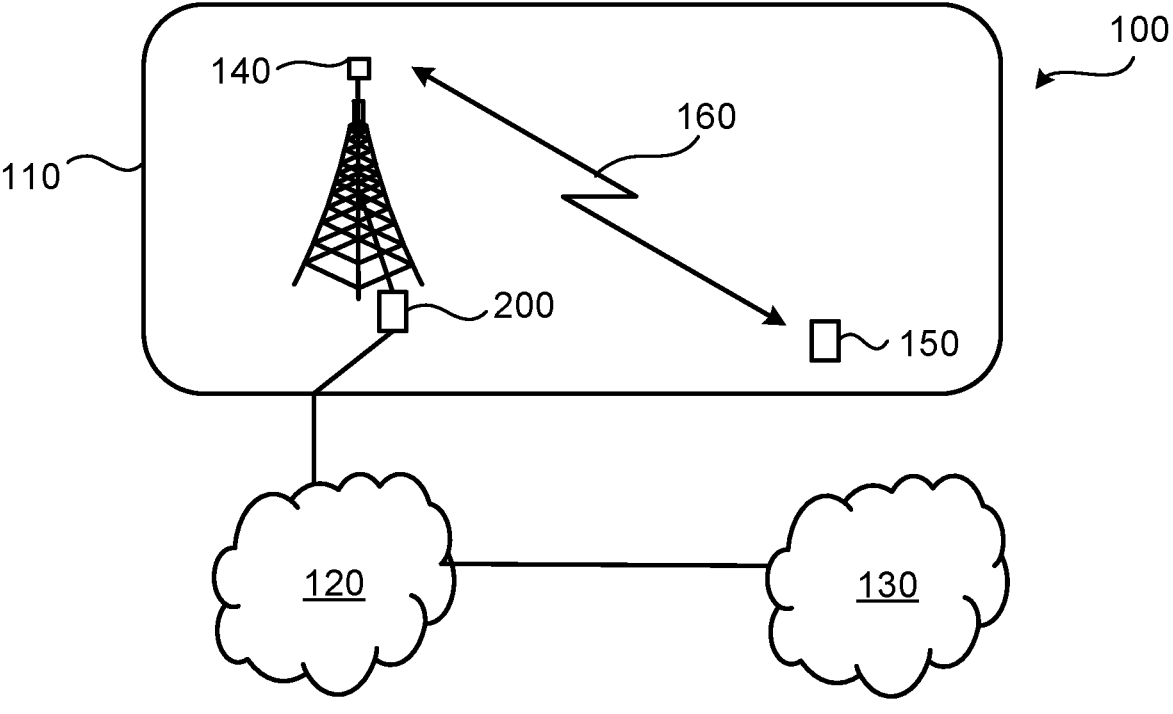
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a transmission and reception point 140 configured to provide network access to user equipment 150 in an (radio) access network 110 over a radio propagation channel 160. The access network 110 is operatively connected to a core network 120. The core network 120 is in turn operatively connected to a service network 130, such as the Internet. The user equipment 150 is thereby, via the TRP 140, enabled to access services of, and exchange data with, the service network 130. The TRP 140 comprises an antenna array and is configured to use beamforming when communicating with the user equipment iso. The beams could be used for either transmission only, or reception only, or for both transmission and reception.

Operation of the TRP 140 is controlled by a network node 200. The network node 200 might be part of, collocated with, or integrated with the TRP 140.

Examples of network nodes 200 are (radio) access network nodes, radio base stations, base transceiver stations, Node Bs (NBs), evolved Node Bs (eNBs), gNBs, access points, access nodes, and integrated access and backhaul nodes. Examples of user equipment 150 are wireless devices, mobile stations, mobile phones, handsets, wireless local loop phones, smartphones, laptop computers, tablet computers, network equipped sensors, network equipped vehicles, and so-called Internet of Things devices.

As noted above there is still a need for an improved acquisition of CSI.

The embodiments disclosed herein therefore relate to mechanisms for event-based triggering of second channel quality measures. In order to obtain such mechanisms there is provided a network node 200, a method performed by the network node 200, a computer program product comprising code, for example in the form of a computer program, that when run on a network node 200, causes the network node 200 to perform the method.

Figure 2:
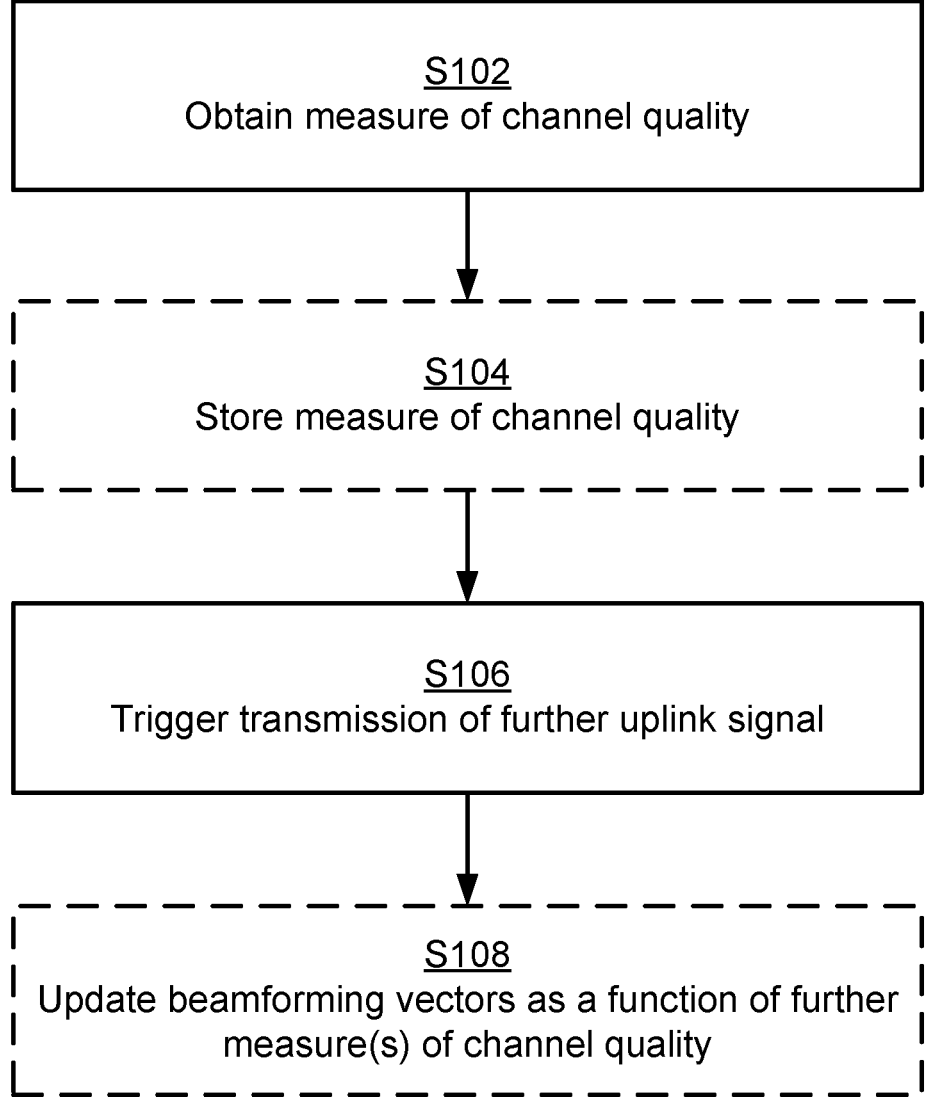
FIGS. 2 and 3 are flowcharts of methods according to embodiments.

FIG. 2 is a flowchart illustrating embodiments of methods for event-based triggering of second channel quality measures. The methods are performed by the network node 200. The methods are advantageously provided as computer programs 620.

In some aspects, the method is based on monitoring, without explicitly triggering any CSI acquisition, the CSI quality. This is achieved by, instead of acquiring CSI, acquiring a substitute, or proxy, for the CSI from which CSI can be derived, or at least estimated. Particularly, the network node 200 is configured to perform step S102:

S102: The network node 200 obtains a first measure of channel quality of a radio propagation channel 160 from measurements on an uplink signal. The uplink signal is received from the user equipment 150. The radio propagation channel 160 extends between the network node 200 and a user equipment 150. The uplink signal is thus received from the user equipment 150 over the radio propagation channel 160.

The first measure of channel quality thus defines, or represents, a proxy for the CSI. The first measure of channel quality is thus an incomplete representation of the radio propagation channel 160 (compared to the CSI), but may still enable detection of changed conditions of the radio propagation channel 160. Whether or not to trigger further (i.e., second) measures of the channel quality can then be determined by comparing the first measure of channel quality to an event-based triggering condition. Particularly, the network node 200 is configured to perform step S106:

S106: The network node 200 triggers, when determining that the first measure of channel quality causes an event-based triggering condition to be fulfilled, transmission of a further uplink signal from the user equipment 150 for the network node 200 to obtain a second measure of the channel quality of the radio propagation channel 160. Determining that the first measure of channel quality causes the event-based triggering condition to be fulfilled involves making a comparison between the first measure of channel quality and a reference channel quality.

A proxy, in terms of the first measure of channel quality, for the existing CSI could thus be compared to a triggering condition and if the first measure of channel quality causes the event-based triggering condition to be fulfilled, for example if the first measure of channel quality differs more than a threshold from the reference channel quality, the radio propagation channel 160 is assumed to have changed significantly, and CSI acquisition is triggered.

Embodiments relating to further details of event-based triggering of second channel quality measures as performed by the network node 200 will now be disclosed.

There could be different ways for the network node 200 to receive the uplink signal from which the first measure of channel quality is obtained. In some embodiments, the uplink signal is received in a narrower frequency interval, or using fewer ports at the network node 200, than the further uplink signal.

There could be different examples of uplink signals from which the first measure of channel quality is obtained. In some non-limiting examples, the first measure of channel quality is obtained from measurements on the uplink signal being any of: a DMRS related to a PUSCH transmission, a DMRS related to a PUCCH transmission, and a RACH preamble.

There could be different types of the first measure of channel quality. According to some embodiments, the first measure of channel quality is an incomplete representation of the radio propagation channel 160. In further detail, denote by $\hat{x}_t$ the first measure of channel quality as obtained for time t. Whilst $\hat{x}_t$ is useful for determining a change in CSI, the first measure of channel quality does not replace the full CSI. In some examples, $\hat{x}_t$ is a channel estimate pertaining to what is measured on a portion of the carrier bandwidth (using for example a narrowband receiver). In some examples, $\hat{x}_t$ is a second order statistics of the radio propagation channel 160 (such as a covariance matrix) which is derived from a channel estimate. In some examples, $\hat{x}_t$ is a wideband channel estimate, but measured on only a subset of user equipment ports. In some examples, $\hat{x}_t$ is a channel estimate constrained to a linear subspace; $\hat{x}_t = w\hat{h}_t$ where W is a "fat" matrix. In some examples, $\hat{x}_t$ is a channel estimate pertaining to what is measured on another carrier than the carrier for which the first measure of channel quality was obtained. In some examples the first measure of channel quality is a measure of a decoding success.

In further some embodiments, the first measure of channel quality pertains to any of: a channel estimate of less than the complete carrier bandwidth, second order statistics of the radio propagation channel 160 as derived from a channel estimate of the radio propagation channel 160, a wideband channel estimate of less than all ports of the user equipment 150, a channel estimate constrained to a linear subspace and pertaining to what is measured on a second carrier different from a first carrier on which the first measure of channel quality was obtained, and a measure of decoding success of the uplink signal. For example, the measure of decoding success could be measured using the cyclic redundancy check (CRC) bits of a transport block or using a hybrid automatic repeat request (HARQ) positive acknowledgement (ACK) or negative acknowledgement (NACK) bit and used as proxy for the CSI quality. If a large proportion of past decoding attempts have failed, this indicates that the CSI was poor, and that further CSI acquisition needs to be triggered.

The first measure of channel quality might be inferred based on a set of parameters, such as channel coherence time, user equipment speed, available resources allocated for channel estimation, etc. Hence, in some embodiments, the first measure of channel quality is impacted by at least one further parameter, the at least one further parameter being any of: channel coherence time of the radio propagation channel 160, speed of the user equipment 150, available resources allocated for channel estimation at the network node 200. A model can be trained to implicitly infer the first measure of channel quality.

In some aspects, the first measure of channel quality is stored after having been obtained in step S102. Thus, in some embodiments, the network node 200 is configured to perform (optional) step S104:

S104: The network node 200 stores the first measure of channel quality.

This enables the first measure of channel quality to be used for further purposes, for example defining a future reference channel quality.

There could be different types of the reference channel quality. In some embodiments, the reference channel quality is a previously obtained measure of channel quality of the radio propagation channel 160. That is, in some examples, the reference channel quality is equal to $\hat{x}_{t-1}$. The event-based triggering condition is then fulfilled when $g(\hat{x}_t, \hat{x}_T) > \theta_1$ for some metric g and threshold value $\theta_1$. In this case the comparison between $\hat{x}_t$ and $\hat{x}_{t-1}$ can be interpreted as a comparison between a proxy for the CSI derived from a uplink transmission at time t and a proxy for CSI derived from stored CSI itself. In some embodiments, the reference channel quality is derived from a previously obtained complete representation of the radio propagation channel 160. In some embodiments, the reference channel quality is represented by a CSI value. That is, in some examples, the reference channel quality is equal to $\bar{x}_{t-1}$, where $\bar{x}_{t-1}$ has been computed in a different manner than $\hat{x}_t$. The event-based triggering condition is then fulfilled when $g(\hat{x}_t, \bar{x}_{t-1}) > \theta_2$ for some metric g and threshold value $\theta_2$. In some examples, $\hat{x}_{t-1}$ is computed from an SRS transmission, whereas $\hat{x}_t$ is computed from another transmission signal.

There could be different examples of the metric g. In general terms, the metric g represents a distance measure, e.g. a Euclidian norm. For example, the metric g might be related to the power of $|\hat{x}_t - \hat{x}_{t-1}|$, derived from $$\hat{x}_t^* \hat{x}_{t-1}$$

(i.e., cross correlation), or derived from inner product of eigenvectors of $\hat{x}_t$. When the metric g exceeds the threshold value, transmission of a further uplink signal from the user equipment 150 is triggered for the network node 200 to obtain a second measure of the channel quality of the radio propagation channel 160. Although the metric g might be a metric for the change of the full channel state, one benefit of the herein disclosed embodiments is that $\hat{x}_t$ can be obtained using normal uplink transmissions (i.e., without any prior explicit triggering of CSI acquisition). The threshold values $\theta_1$, $\theta_2$ might depend on the expected channel estimation quality.

There could be different types of the event-based triggering condition. In general terms, the event-based triggering condition is based on the metric g. In some embodiments, the event-based triggering condition is fulfilled when the first measure of channel quality differs more than a threshold value from the reference channel quality. In some embodiments, the event-based triggering condition is fulfilled when a timestamp of the first measure of channel quality differs more than a threshold value from a timestamp of the reference channel quality. In some embodiments, the comparison between the first measure of channel quality and the reference channel quality is any of: a power difference, a cross correlation, an inner product between the first measure of channel quality and the reference channel quality.

In some non-limiting examples, the comparison between the first measure of channel quality and the reference channel quality pertains to at least one of: channel quality accuracy, channel quality freshness, and channel quality rotation. The channel quality accuracy is defined in terms of channel estimation error of channel estimation of the radio propagation channel 160 (e.g. the variance of channel estimation error when linear minimum mean square error (LMMSE) filter is applied for channel estimation). The channel quality freshness is defined in terms of variation between the first measure of channel quality and a previously obtained measure of the channel quality. The channel quality rotation is defined in terms of channel subspace rotation between the first measure of channel quality and a previously obtained measure of the channel quality. Depending on the conditions (e.g. user equipment speed, signal to noise ratio (SNR), etc.), the second measure of channel quality can be used to improve the CSI quality either by improving the CSI accuracy (e.g. when SNR is low), or by improving the CSI freshness (e.g. when user equipment speed is high and the CSI estimates become outdated quickly), or by finding CSI estimates that are more aligned to the original channel gains and hence have larger cross-correlation with the original channel gains. In some examples, the CSI quality measure, represented by $Q_{CSI}$, can be quantified as follows:

$$Q_{CSI} = \alpha_1 f(\sigma_e^2) + \alpha_2 g(\|\hat{x}_t - \hat{x}_{t-1}\|^2) + (1 - \alpha_1 - \alpha_2) v(\hat{x}_t^* \hat{x}_{t-1}),$$

where $$\sigma_e^2$$

is a channel estimation error, $\hat{x}_t$ is first measure of channel quality as obtained for time t, $f(\cdot)$ is a metrics to measure the CSI accuracy, $g(\cdot)$ is a metrics to measure the CSI freshness, and $v(\cdot)$ is a metrics to measure the CSI rotation, respectively. The parameters $\alpha_1$ and $\alpha_2$ (where $0 < \alpha_1 < 1$, $0 < \alpha_2 < 1$, $0 < \alpha_1 + \alpha_2 < 1$) specify the importance of each of these three factors in the CSI quality measure.

In some embodiment, a periodic transmission of a respective further uplink signal from the user equipment 150 for the network node 200 to obtain a respective second measure of the channel quality of the radio propagation channel 160 is triggered. The periodicity and transmission power of each respective further uplink signal is dependent on the comparison between the first measure of channel quality and the reference channel quality. Assume that the uplink signal from the user equipment 150 on which the first measure of the channel quality was made was transmitted at a nominal frequency of occurrence and with a nominal transmission power. The below examples show how the nominal frequency of occurrence and the nominal transmission power could be altered for the periodic transmission of a respective further uplink signal from the user equipment 150. For example if $$f(\sigma_e^2) > \gamma, \text{ and } g(\|\hat{x}_t - \hat{x}_{t-1}\|^2) < \delta \text{ and } v(\hat{x}_t^* \hat{x}_{t-1}) > \beta,$$

then the radio propagation channel 160 is static (or only slowly changing) and the SNR is low. The uplink signals are then triggered to be transmitted less frequently but with higher power. For example, if $$f(\sigma_e^2) < \gamma, \text{ and } g(\|\hat{x}_t - \hat{x}_{t-1}\|^2) > \delta \text{ or and } v(\hat{x}_t^* \hat{x}_{t-1}) < \beta),$$

then the radio propagation channel 160 is non-stationary (changing fast) and the SNR is large. The uplink signals are then triggered to be transmitted more frequently but with reduced transmit power. For example, if $$f(\sigma_e^2) > \gamma, \text{ and } \left(g\left(\|\hat{x}_t - \hat{x}_{t-1}\|^2\right) > \delta\right)$$

or and $$v(\hat{x}_t^* \hat{x}_{t-1}) < \beta),$$

then the radio propagation channel 160 is non-stationary (changing fast) and the SNR is low. The uplink signals are then triggered to be transmitted more frequently and with increased transmit power. For example, if $f(\sigma_e^2) < \gamma$, and $$f(\sigma_e^2) < \gamma, \text{ and } g\left(\|\hat{x}_t - \hat{x}_{t-1}\|^2\right) < \delta \text{ and } v(\hat{x}_t^* \hat{x}_{t-1}) > \beta,$$

then the radio propagation channel 160 is stationary (or only slowly changing) and the SNR is large. The uplink signals are then triggered to be transmitted less frequently and with decreased transmit power.

There could be different uses of the second measure of the channel quality. In some aspects, the second measure of the channel quality is used when updating beamforming vectors. In particular, in some embodiments, the network node 200 is configured to perform (optional) step S108:

S108: The network node 200 updates beamforming vectors as a function of the second measure of the channel quality. The beamforming vectors are to be applied during at least one of downlink transmission and uplink reception.

Step S108 thus implies that transmission of a further uplink signal from the user equipment 150 has been triggered, that the user equipment 150 has transmitted such a further uplink signal, and that the network node 200 has obtained a second measure of the channel quality of the radio propagation channel 160 from the further uplink signal.

The beamforming vectors could be applied either only for reception of signals from the user equipment 150, only for transmission of signals towards the user equipment 150, or for both reception of signals from the user equipment 150 and transmission of signals towards the user equipment 150.

Hence, the beamforming vectors could be applied when receiving uplink reference signals (such as SRS) or an uplink data transmission (such as a Physical Uplink Shared Channel (PUSCH) transmission) or an uplink control transmission (such as a Physical Uplink Control Channel (PUCCH) transmission), or when transmitting downlink reference signals (such as CSI-RS) or a downlink data transmission (such as a Physical Downlink Shared Channel (PDSCH) transmission) or a downlink control transmission (such as a Physical Downlink Control Channel (PDCCH) transmission).

In some embodiments, the beamforming vectors are updated based on an estimated covariance matrix of the second measure of the channel quality.

For example, the estimated covariance matrix can be used to select the beams to be used for reception. In some aspects, the beamforming vectors are only updated if they differ from currently used beamforming vectors.

In some aspects, if there is not any triggering of transmission of a further uplink signal from the user equipment 150 for the network node 200 to obtain a second measure of the channel quality of the radio propagation channel 160, then the first measure of the channel quality can be used together with any previously stored measure of the channel quality to refine the CSI estimates and enhance the CSI quality via CSI accuracy improvement. Thus, in some embodiments, the reference channel quality is a combination of at least two previously obtained measures of channel quality of the radio propagation channel 160, where at least one of the previously obtained measures of channel quality was obtained in a wider frequency interval, or using more ports at the network node 200, than the first measure of channel quality. The correlation between measures of channel quality obtained from uplink signals received using a narrowband receiver and measures of channel quality obtained from uplink signals received using a wideband receiver can be used to enhance the CSI estimate over the wideband receiver from the measures of channel quality obtained from uplink signals received using a narrowband receiver. For example, a wideband measure of channel quality $\hat{x}_{WB}$ can be inferred from a narrowband measures of channel quality $y_{NB}$ as follows:

$$\hat{x}_{WB} = AB^{-1} y_{NB},$$

where $A = \text{Cov}(x_{WB}, x_{NB})$, $B = \text{Cov}(x_{NB}, x_{NB})$. The notation $\text{Cov}(x, y)$ represents the covariance matrix between vectors $x$ and $y$. The covariance matrices can be estimated based on measurements over multiple time instances.

Figure 3:
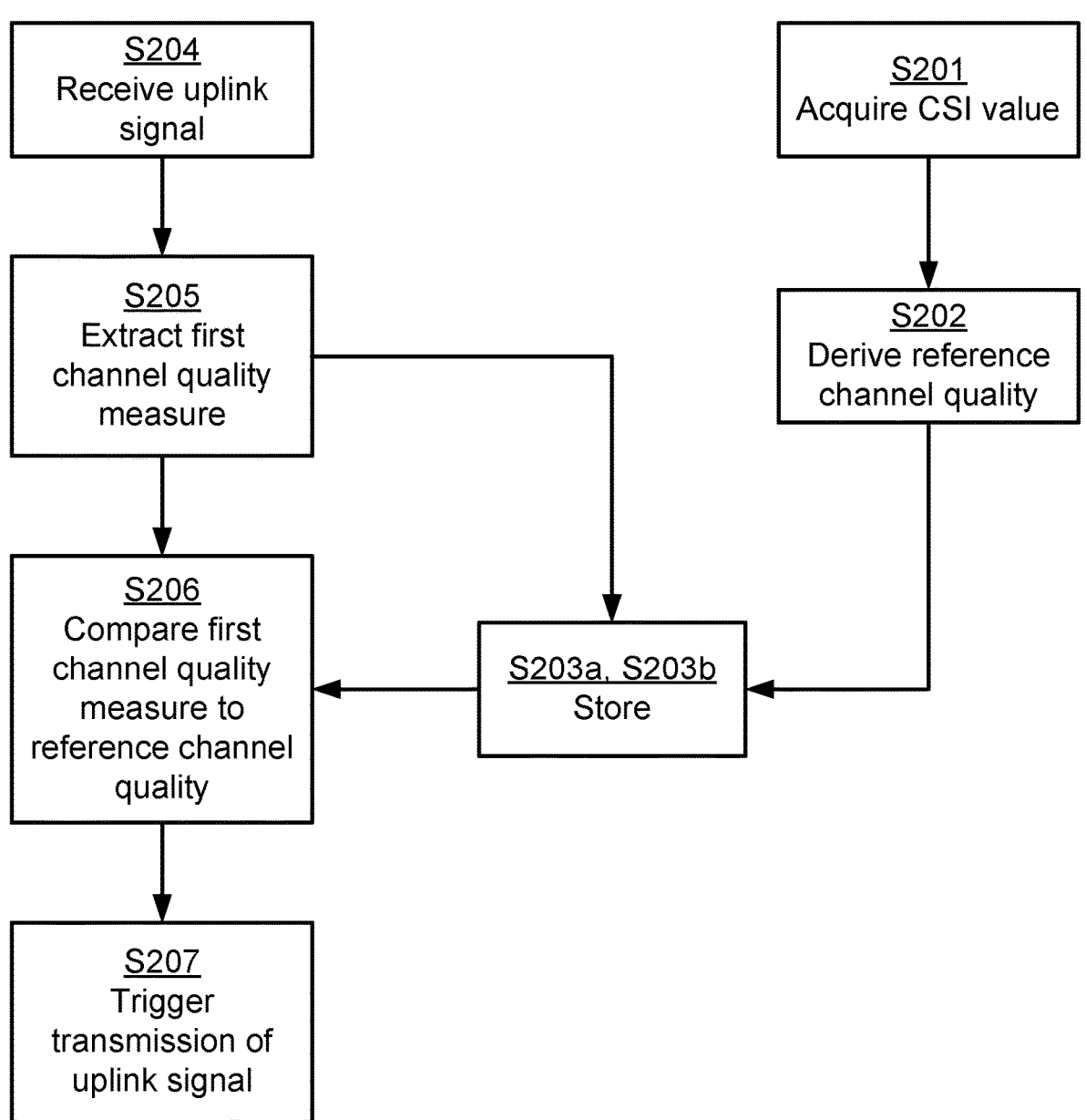

Reference is now made to the flowchart of FIG. 3 for disclosure of a method for event-based triggering of second channel quality measures as performed by the network node 200 according to at least some of the above disclosed embodiments.

S201: The network node 200 acquires a CSI value.

S202: The network node 200 derives a reference channel quality from the CSI value, e.g. by extracting the reference channel quality from the CSI value or by condensing the CSI value to the reference channel quality.

S203*a*: The network node 200 stores the reference channel quality for future use.

S204: The network node 200 receives uplink signals.

S205: The network node 200 extracts a first channel quality measure from the received uplink signals.

S203*b*: The network node 200 stores the first channel quality measure for future use.

S206: The network node 200 compares the first channel quality measure to the reference channel quality.

S207: The network node 200 triggers transmission of a further uplink signal from the user equipment iso for the network node 200 to obtain a second measure of the channel quality of the radio propagation channel 160. The transmission is triggered when the network node 200 determines, based on the comparison between the first channel quality measure and the reference channel quality, that the first measure of channel quality causes an event-based triggering condition to be fulfilled.

Figure 4:
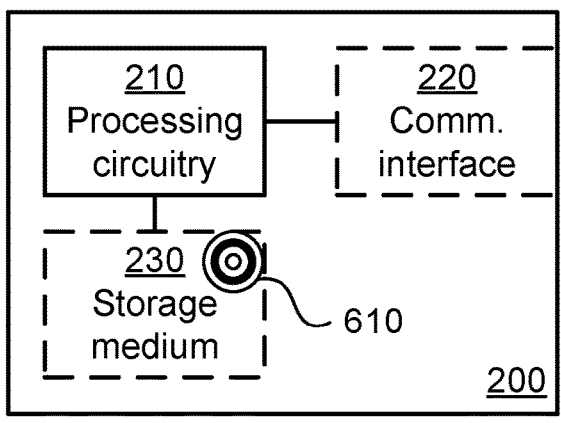
FIG. 4 is a schematic diagram showing functional units of a network node according to an embodiment.

FIG. 4 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other devices, nodes, and entities of the communications network 100, such as the TRP 140 and the core network 120 as well as devices, nodes, and entities served in the communications network 100, such as the user equipment iso. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 5:
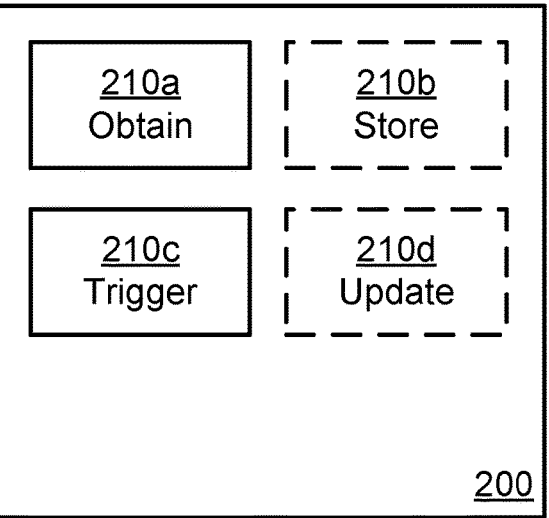
FIG. 5 is a schematic diagram showing functional modules of a network node according to an embodiment.

FIG. 5 schematically illustrates, in terms of a number of functional modules, the components of a network node 200 according to an embodiment. The network node 200 of FIG. 5 comprises a number of functional modules; an obtain module 210a configured to perform step S102, and a trigger module 210C configured to perform step S106. The network node 200 of FIG. 5 may further comprise a number of optional functional modules, such as any of a store module 210b configured to perform step S104, and an update module 210d configured to perform step S108. In general terms, each functional module 210a:210d may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a:210d may be implemented by the processing circuitry 210, possibly in cooperation with the communications interface 220 and/or the storage medium 230. The processing circuitry 210 may thus be configured to from the storage medium 230 fetch instructions as provided by a functional module 210a:210d and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 4 the processing circuitry 210 may be distributed among a plurality of devices, or nodes. The same applies to the functional modules 210a:210d of FIG. 5 and the computer program 620 of FIG. 6.

Figure 6:
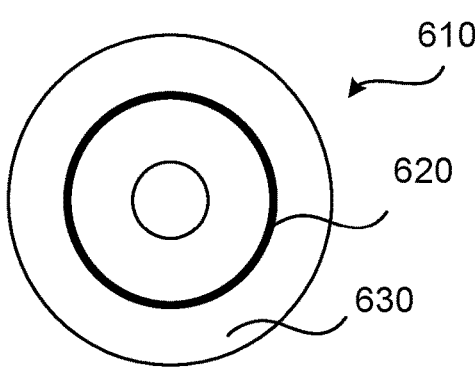
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for event-based triggering of second channel quality measures, the method being performed by a network node, the method comprising:
 obtaining a first measure of channel quality of a radio propagation channel extending between the network node and a user equipment from measurements on an uplink signal received from the user equipment;

triggering, when determining that the first measure of channel quality causes an event-based triggering condition to be fulfilled, transmission of a further uplink signal from the user equipment for the network node to obtain a second measure of the channel quality of the radio propagation channel, wherein determining that the first measure of channel quality causes the event-based triggering condition to be fulfilled involves making a comparison between the first measure of channel quality and a reference channel quality; and updating beamforming vectors as a function of the second measure of the channel quality, wherein the beamforming vectors are to be applied during at least one of downlink transmission and uplink reception, wherein the beamforming vectors are updated based on an estimated covariance matrix of the second measure of the channel quality.

2. The method according to claim 1, wherein the method further comprises:

storing the first measure of channel quality.

3. The method according to claim 1, wherein the first measure of channel quality is an incomplete representation of the radio propagation channel.

4. The method according to claim 1, wherein the reference channel quality is a previously obtained measure of channel quality of the radio propagation channel.

5. The method according to claim 1, wherein the reference channel quality is derived from a previously obtained complete representation of the radio propagation channel.

6. The method according to claim 1, wherein the reference channel quality is represented by a CSI value.

7. The method according to claim 1, wherein the event-based triggering condition is fulfilled when the first measure of channel quality differs more than a threshold value from the reference channel quality.

8. The method according to claim 1, wherein the event-based triggering condition is fulfilled when a timestamp of the first measure of channel quality differs more than a threshold value from a timestamp of the reference channel quality.

9. The method according to claim 1, wherein the comparison between the first measure of channel quality and the reference channel quality is any of: a power difference, a cross correlation, an inner product between the first measure of channel quality and the reference channel quality.

10. The method according to claim 1, wherein the comparison between the first measure of channel quality and the reference channel quality pertains to at least one of: channel quality accuracy, channel quality freshness, and channel quality rotation, wherein the channel quality accuracy is defined in terms of channel estimation error of channel estimation of the radio propagation channel, wherein the channel quality freshness is defined in terms of variation between the first measure of channel quality and a previously obtained measure of the channel quality, and wherein the channel quality rotation is defined in terms of channel subspace rotation between the first measure of channel quality and a previously obtained measure of the channel quality.

11. The method according to claim 1, wherein the reference channel quality is a combination of at least two previously obtained measures of channel quality of the radio propagation channel, and wherein at least one of the previously obtained measures of channel quality was obtained in a wider frequency interval, or using more ports at the network node, than the first measure of channel quality.

12. The method according to claim 1, wherein the first measure of channel quality pertains to any of: a channel estimate of less than the complete carrier bandwidth, second order statistics of the radio propagation channel as derived from a channel estimate of the radio propagation channel, a wideband channel estimate of less than all ports of the user equipment, a channel estimate constrained to a linear subspace and pertaining to what is measured on a second carrier different from a first carrier on which the first measure of channel quality was obtained, and a measure of decoding success of the uplink signal.

13. The method according to claim 1, wherein the first measure of channel quality is impacted by at least one further parameter, the at least one further parameter being any of: channel coherence time of the radio propagation channel, speed of the user equipment, available resources allocated for channel estimation at the network node.

14. The method according to claim 1, wherein a periodic transmission of a respective further uplink signal from the user equipment for the network node to obtain a respective second measure of the channel quality of the radio propagation channel is triggered, the periodicity and transmission power of which is dependent on the comparison between the first measure of channel quality and the reference channel quality.

15. The method according to claim 1, wherein the first measure of channel quality is obtained from measurements on the uplink signal any of: a DMRS related to a PUSCH transmission, a DMRS related to a PUCCH transmission, and a RACH preamble.

16. The method according to claim 1, wherein the uplink signal is obtained in a narrower frequency interval, or using fewer ports at the network node, than the further uplink signal.

17. A network node for event-based triggering of second channel quality measures, the network node comprising processing circuitry, the processing circuitry being configured to cause the network node to:

obtain a first measure of channel quality of a radio propagation channel extending between the network node and a user equipment from measurements on an uplink signal received from the user equipment;

trigger, when determining that the first measure of channel quality causes an event-based triggering condition to be fulfilled, transmission of a further uplink signal from the user equipment for the network node to obtain a second measure of the channel quality of the radio propagation channel, wherein determining that the first measure of channel quality causes the event-based triggering condition to be fulfilled involves making a comparison between the first measure of channel quality and a reference channel quality; and update beamforming vectors as a function of the second measure of the channel quality, wherein the beamforming vectors are to be applied during at least one of downlink transmission and uplink reception, wherein the beamforming vectors are updated based on an estimated covariance matrix of the second measure of the channel quality.

18. A network node for event-based triggering of second channel quality measures, the network node comprising:

an obtain module configured to obtain a first measure of channel quality of a radio propagation channel extending between the network node and a user equipment from measurements on an uplink signal received from the user equipment;

a trigger module configured to trigger, when determining that the first measure of channel quality causes an event-based triggering condition to be fulfilled, transmission of a further uplink signal from the user equipment for the network node to obtain a second measure of the channel quality of the radio propagation channel, wherein determining that the first measure of channel quality causes the event-based triggering condition to be fulfilled involves making a comparison between the first measure of channel quality and a reference channel quality; and an update module configured to update beamforming vectors as a function of the second measure of the channel quality, wherein the beamforming vectors are to be applied during at least one of downlink transmission and uplink reception, wherein the beamforming vectors are updated based on an estimated covariance matrix of the second measure of the channel quality.

19. A computer program product for event-based triggering of second channel quality measures, comprising a non-transitory computer readable medium storing a computer program comprising computer code which, when run on processing circuitry of a network node, causes the network node to:

obtain a first measure of channel quality of a radio propagation channel extending between the network node and a user equipment from measurements on an uplink signal received from the user equipment;

trigger, when determining that the first measure of channel quality causes an event-based triggering condition to be fulfilled, transmission of a further uplink signal from the user equipment for the network node to obtain a second measure of the channel quality of the radio propagation channel, wherein determining that the first measure of channel quality causes the event-based triggering condition to be fulfilled involves making a comparison between the first measure of channel quality and a reference channel quality; and update beamforming vectors as a function of the second measure of the channel quality, wherein the beamforming vectors are to be applied during at least one of downlink transmission and uplink reception, wherein the beamforming vectors are updated based on an estimated covariance matrix of the second measure of the channel quality.

*  *  *  *  *